W. D. WILSON.
CORN CRUSHER AND GRINDER.
No. 12,977.  Patented May 29, 1855.
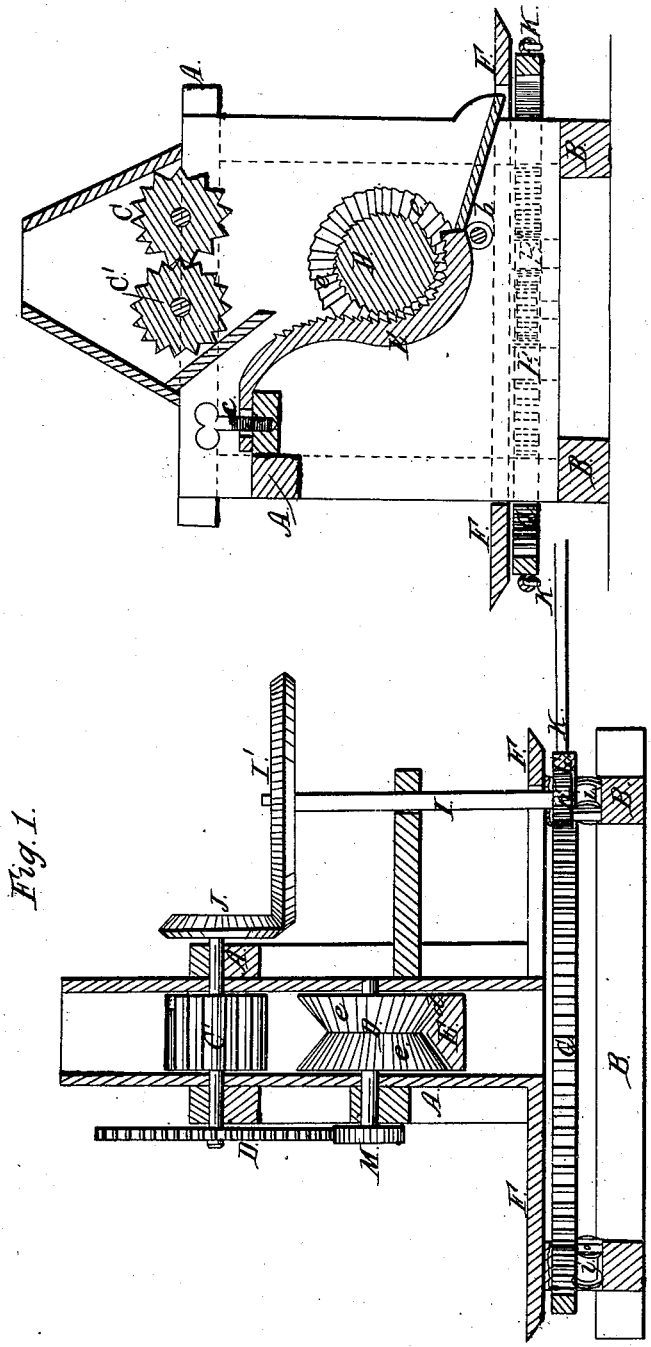

UNITED STATES PATENT OFFICE.

WM. D. WILSON, OF RICHMOND, INDIANA.

CORN GRINDER AND CRUSHER.

Specification of Letters Patent No. 12,977, dated May 29, 1855.

*To all whom it may concern:*

Be it known that I, WM. D. WILSON, of Richmond, in the county of Wayne and State of Indiana, have invented a new and useful Improvement in Machines for Crushing and Grinding Corn; and I do hereby declare that the following is a full, clear, and exact description of the same, reference being had to the accompanying drawings, forming part of this specification, in which—

Figure 1, is a vertical, longitudinal section of a corn crusher and grinder with my improvements, Fig. 2, is a vertical, transverse section of the same.

Similar letters of reference indicate corresponding parts in the several figures.

The nature of my invention consists in the general arrangement and combination of the several parts as hereinafter shown, whereby a single, cheap and portable crushing and grinding machine is produced.

To enable others skilled in the art to make and use my invention, I will proceed to describe its construction and operation.

A, B, represent the frame of the machine.

C, C', are two crushing rollers arranged at the top of the part A, of the frame; these rollers have V shaped teeth and serve for preparing the corn for the grinding operation.

D, is the revolving grooved, grinding roller placed underneath the rollers C, C', in the center of the space between the shafts of the same as represented.

E, is the concave in which the roller D, turns, the lower end of this concave is hinged at $b$, and the upper part secured by a set screw $c$, so that it may be moved nearer to or farther from the roller D, according as it is desired to have the corn ground; the inner periphery of this concave is of a shape to correspond with the grooved roller D, as represented and is provided with teeth or corrugations $d, d$, which serve in connection with similar, corrugations or teeth $e, e$, for cutting up or grinding the corn, they operating owing to the shape of the cylinder and the concave, like shears upon the corn, in its passage from the center to the edges of the groove, it being caused thus to pass outward from the center by the shape of the concave and by centrifugal force.

F, represents the platform which I provide for the reception of the corn and the attendant to stand and operate upon. This platform may be circular and of about 17 or 18 feet diameter and is placed over the main driving wheel and supported by the parts B of the frame, as shown in the drawing. By thus arranging this platform the attendant can stand upon it without being in the way of the horse as he travels around in a circle, and the corn to be ground can be dumped upon it and thus be at hand ready for being fed into the machine.

G, is the annular or main driving wheel placed under the platform F, on friction rollers $i, i$. H, is a pinion gearing into said wheel, this pinion is on the shaft I, which has a large bevel wheel I' on its upper end which gears into a small bevel wheel J, on the shaft of the crushing roller C', and sets said roller in rapid motion.

K, is the lever to which the horse is attached.

L, is a spur wheel on the end of the roller C', gearing into a small pinion M, on the shaft of the grinding roller D, and giving motion to the said roller as the main driver revolves.

Operation: A large quantity of corn being dumped upon the platform, the horse is attached to the lever and the machine set in operation. A sufficient quantity of corn is fed into the machine by the attendant. At proper intervals the machine is supplied with corn, it being first introduced to the crushing rollers through the hopper, which operate upon and prepare the corn for the grinding operation; from the crushing rollers the corn falls upon the corrugated grinding roller, passes to the center of the groove of the grinding roller and then caused by centrifugal force to pass from the center of the roller to its ends and in its passage is operated upon and ground very fine and perfectly by the teeth of the roller and concave which connected, operate like shears, as may be evident.

This machine is quite simple, compact and portable and will perform the crushing and grinding operations with greater facility and more perfectly and with a less expenditure of power, as friction is avoided by the teeth operating like shears. And also owing to the platform being arranged as stated the machine is very convenient and no time is lost in feeding the machine as this operation can be performed by the attendant while standing upon the platform without the necessity of stopping the machine and interfering with the movement of the horse in a circle.

What I claim as my invention and desire to secure by Letters Patent, is—

The general arrangement and combination of the crushing rollers C, C', grinding roller D, adjustable concave E, platform F, and gearing G, H, I, J, K, L, M, substantially as and for the purposes set forth.

WM. D. WILSON.

Witnesses:
HERMAN B. PAYNE,
JOHN FINLEY.